Feb. 8, 1966     D. L. HICKS ET AL     3,233,405
JET NOZZLE FEEDBACK CONTROL SYSTEM
Filed July 2, 1964
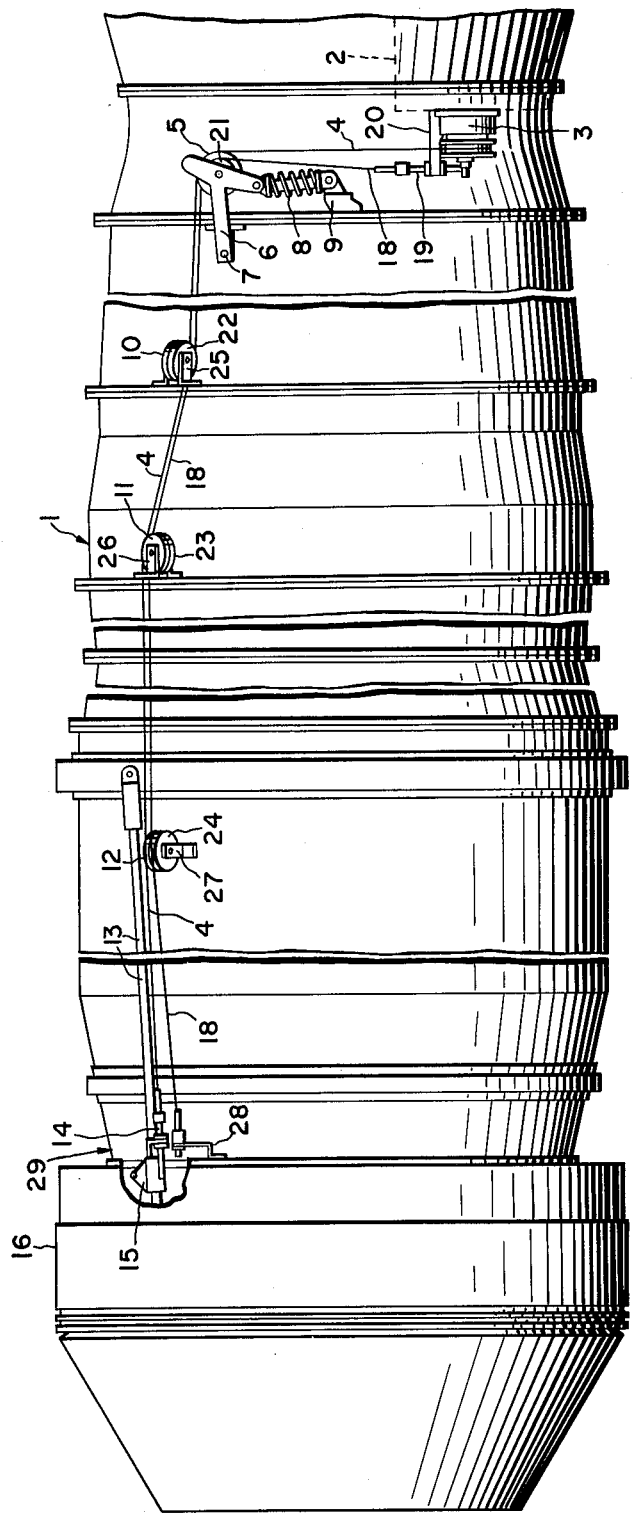
INVENTORS
DUANE L. HICKS
LAVERNE E. MORGAN
BY *Paul B. Hunter*
ATTORNEY

# United States Patent Office 3,233,405
Patented Feb. 8, 1966

3,233,405
JET NOZZLE FEEDBACK CONTROL SYSTEM
Duane Leland Hicks and La Verne Elmo Morgan, Orange, Calif., assignors to Pacific Scientific Company, San Francisco, Calif., a corporation of California
Filed July 2, 1964, Ser. No. 379,921
3 Claims. (Cl. 60—35.6)

This invention relates, generally, to feedback control systems and the invention relates, more particularly, to a novel flexible cable feedback control system which, among other uses, is especially valuable for use with jet aircraft engines to prevent hunting of the engine variable nozzle area and resultant thrust pulsing of the engine.

Heretofore, it has been common to provide a feedback connection from the nozzle to the hydraulic controls of the variable area engine nozzle, but these feedback connections have been unsatisfactory, due to the inherent limitations of the structures used which result in inaccurate feedback due to backlash, excessive friction, engine temperature variations, engine flexure, etc., resulting in undesired hunting of the engine. For example, push-pull feedback controls have been used in the past which operate at considerable friction, hysteresis and lost motion.

Their connection between the forward nozzle area control and the rear nozzle hydraulic actuators form a closed loop consisting, for example, of a push-pull cable in a conduit acting under compression forces when the nozzle moves toward closed position, and under tension forces when the nozzle moves toward open position. These alternating compression and tension forces create a considerable amount of lost motion, and the cable sliding thus creates considerable friction inside its conduit and around various bends.

Additional length variations and resulting inaccuracies in the feedback are due to engine thermal variations which are great along the length of the feedback connection, and to structural deflection of the engine as the aircraft goes through its maneuvers. All such inaccuracies in the feedback loop result in erroneous signals being sent to the nozzle area control, creating undesired hunting of the engine. With continuous hunting or pulsing of the engine taking place as in the case of these prior art devices a variation of, say, fifty pounds engine thrust, while not harmful at takeoff when the engine may be putting out 15,000 pounds of thrust, nevertheless becomes serious at altitude under cruise conditions, when the engine may be only putting out 300 pounds of thrust, for the 50 pound thrust variation still remains and becomes a significant portion of the total engine thrust, and can be felt in the airplane and results in shorter engine life and greater maintenance costs. The vibrations resulting from this pulsing decrease the fatigue life of many engine components.

It is the principal object of the present invention to provide a novel feedback control system that overcomes objections of the prior systems by employing a single control cable connecting the controlling and controlled members, the said cable passing over anti-friction supported pulleys, thereby greatly reducing friction, hysteresis and lost motion, the said novel system also employing a deflection sensing cable cooperating with the control cable to compensate for thermal and structural length variations.

A feature of the present invention is to provide a novel, easily constructed and reliable feedback control system of the above character that is especially suited for engine nozzle control and employs a single flexible feedback cable operating on bearing mounted pulleys, the cable being attached to the nozzle geometry at the aft end of the engine and to a spring loaded control assembly at the nozzle area control, the linear motion of the aft portion of the cable being transferred to rotary motion at the control assembly.

Another feature of the present invention is to provide a novel feedback control system of the above character wherein thermal and structural length variation compensation is accomplished by the use of an additional flexible cable that runs parallel to the feedback control cable, being routed through the various pulley brackets carrying the feedback cable, and which acts as a deflection sensing cable, the said deflection sensing cable being attached to engine structure at both the aft end of the engine and at the nozzle area control, the deflection sensing cable being held taut by having one of the pulley brackets mounted on a pivot and spring loaded to tension the same, movement of the pulley bracket and the supported feedback cable serving to compensate for any tendency of this feedback cable to alter its effective length due to thermal and structural length variations of the system.

Another feature of the invention is to provide a novel feedback control cable system that has long life in use, is rugged and not susceptible to inadvertant damage.

Other features and advantages of the invention will become apparent as the description proceeds.

The single figure of the drawing shows a fragmentary view looking up at a jet engine employing the novel feedback system of this invention.

In the drawing the novel feedback control system is shown applied to a jet engine 1 for effecting feedback between the nozzle area control 2 forward in the engine and the nozzle hydraulic actuator rod 13 at the rear of the engine; however, it is to be understood that the feedback control system of this invention is adapted for use wherever a feedback is desired, and is especially valuable in those installations such as aircraft controls, where low operating forces are required, an appreciable amount of deflection is involved, and where an absolute minimum of friction and lost motion is required.

While the present invention relates only to the feedback system, a brief description of its use in a jet engine will be given. Efficiency or fuel economy is a primary consideration in operating a jet engine, especially for use on aircraft, and to obtain maximum efficiency a constant temperature of, say, 1140° F.±5° F. must be maintained in the region of the combustion casing, the temperature being maintained by opening and closing the nozzle as required to either let any excess heat out or to hold heat in. Thus, thermocouples inside the engine sense the average temperature of the chamber, an electrical signal is sent to an amplifier in order to produce enough current to operate a torque motor located inside the nozzle area control housing or unit 2, which motor positions a cam within housing 2 that in turn is connected through a hydraulic system to the engine nozzle hydraulic actuators. The actuators position the engine nozzle, located within housing 16, according to the inputs of the thermocouples.

According to the present invention the feedback side of the differential gear in nozzle control housing 2 is connected to a spring loaded sheave 3 around which is wrapped and secured the novel feedback cable 4 that extends to and over a pulley 5 carried by a pivoted bracket arm 6 pivoted on the engine at 7. A compensating compression spring 8 is confined between a fixed bracket 9 and the pivoted bracket 6.

From the pulley 5 the feedback cable 4 passes rearwardly and over guide pulleys 10, 23 and 12 and is attached at its rearward end by the adjustable connector 14 and attaching bracket 15 to a shaft 13 connected to the nozzle hydraulic actuator. Thus, any linear motion of the hydraulic actuator connected to shaft 13 and to the engine nozzle is transferred by cable 4 to rotary motion of the sheave 3 at the nozzle control housing since cable 4 is wrapped around sheave 3, thus accomplishing the feedback function.

Thermal and structural length variation compensation is accomplished by the use of an additional flexible cable 18 which is adjustably attached by connector 19 to the bracket arm 20 extending from the spring loaded sheave housing mounted on the nozzle area control housing or unit 2. This compensating cable 18 extends over pulley 21, mounted on the same pivot pin as pulley 5. From pulley 21, cable 18 extends rearwardly along the engine and over pulleys 22, 11 and 24 mounted on the same pivot pins as pulleys 10, 11 and 12 respectively, these pulleys being supported by their pivot pins in idler pulley brackets 25, 26 and 27 attached to the engine. The rear end of cable 18 is attached to bracket 28 on the aft end of the engine tailpipe 29.

Since cable 18 runs close to and substantially parallel along its length to the feedback control cable 4 as it is routed through the several pulley brackets and is attached at its forward and rear ends to the engine adjacent to the ends of the control cable, it is sensitive to thermal and structural length variations of the engine with respect to the control cable and will accordingly cause the pivoted compensation bracket arm 6 and its pulleys 5 and 21 to be repositioned as the result of such thermal and structural deflections, and hence will retain the feedback control cable 4 from moving sheave 3 due to said thermal and structural variations, thereby eliminating the introduction of erroneous feedback signals.

Thus it will be noted that the novel feedback control system of this invention using cables that pass at all bends over bearing supported pulleys is substantially friction-free as compared with push-pull cables with their excessive internal sliding friction between the cable and its casing, especially at bends, thus appreciably reducing hysteresis. There is no reversal of load in the present system, as compared with the push-pull system, so that lost motion or backlash is substantially eliminated. Furthermore, the open flexible cable system of the present invention is generally both lighter and less expensive than the push-pull system, and also due to its inherent flexibility rather than rigidity, if foreign objects such as structure, tools, or personnel contact the cable, it flexes to accommodate the applied force, and yet returns to its original shape when the force is removed, in contrast to the push-pull and similar systems which become distorted from applied force, resulting in increased friction. Furthermore, any damage to the present system is shown by visual inspection and repair and replacement can be easily accomplished. The feedback control system equipment of this invention is compact and occupies but a little space when packaged, which is not true of push-pull systems.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A feedback control system for jet engines having a nozzle area control unit on the forward portion of the engine and a hydraulic operated nozzle actuator near the rear thereof comprising a flexible feedback cable connected at one end to the nozzle actuator and to the nozzle area control unit at its other end for actuating the latter in response to movements of said actuator, a flexible compensating cable connected to engine structure at one end adjacent to the nozzle actuator and connected to engine structure at its other end adjacent to the feedback cable attachment at said nozzle area control unit, said compensating cable extending substantially parallel to said feedback cable, pulley means engaging said cables, and compensating means controlled by said compensating cable and acting through said pulley means on said feedback cable to counteract the effects of thermal and structural deflection of the engine in use.

2. A feedback control system as defined in claim 1 wherein said compensating means comprises a spring pressed arm supporting said pulley means to apply deflection corrections to said feedback cable as permitted by said compensating cable.

3. A feedback system of the character described for jet engines having a variable area nozzle orifice varied by a hydraulic drive and a remotely located nozzle control means, said feedback system comprising a feedback cable extending from said hydraulic drive to said nozzle control means, a compensating cable extending from a point on said engine adjacent said hydraulic drive to a point thereon adjacent said nozzle control means, bias means for applying tension to said compensating cable, said bias means keeping said tension constant as said compensating cable responds to temperature and structural changes affecting the engine, said bias means, under the restraint of said compensating cable, also engaging said feedback cable to retain the feedback cable from affecting said control means responsive to such temperature or structural changes.

References Cited by the Examiner
UNITED STATES PATENTS

| | | | |
|---|---|---|---|
| 2,586,048 | 2/1952 | Hyatt | 254—161 |
| 2,866,621 | 12/1958 | McIntyre | 254—150 |
| 3,048,971 | 8/1962 | Alford | 60—35.6 |
| 3,068,644 | 12/1962 | Worsham | 60—35.6 |
| 3,131,909 | 5/1964 | Peterson | 254—175.5 |

MARK NEWMAN, *Primary Examiner.*

RALPH D. BLAKESLEE, *Examiner.*